(12) United States Patent
Jang et al.

(10) Patent No.: US 11,390,324 B2
(45) Date of Patent: Jul. 19, 2022

(54) APPARATUS AND METHOD FOR SUPPORTING PARKING

(71) Applicant: HYUNDAI MOBIS CO., LTD., Seoul (KR)

(72) Inventors: Joo Young Jang, Yongin-si (KR); Dong Yul Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 85 days.

(21) Appl. No.: 16/858,207

(22) Filed: Apr. 24, 2020

(65) Prior Publication Data

US 2020/0339196 A1 Oct. 29, 2020

(30) Foreign Application Priority Data

Apr. 26, 2019 (KR) ........................ 10-2019-0048848

(51) Int. Cl.
| | |
|---|---|
| *B62D 15/02* | (2006.01) |
| *B60W 40/06* | (2012.01) |
| *B60W 60/00* | (2020.01) |
| *B60W 30/06* | (2006.01) |

(52) U.S. Cl.
CPC ......... *B62D 15/0285* (2013.01); *B60W 30/06* (2013.01); *B60W 40/06* (2013.01); *B60W 60/0025* (2020.02); *B60W 2420/42* (2013.01); *B60W 2554/20* (2020.02); *B60W 2554/4049* (2020.02)

(58) Field of Classification Search
CPC ........... G06K 9/00208; G06K 9/00201; G06K 9/00812; B60R 2300/304; B60R 2300/305; B60R 2300/806; B62D 15/0285; B62D 15/0275; B60W 30/06; B60T 2201/10

See application file for complete search history.

(56) References Cited

U.S. PATENT DOCUMENTS

| | | | |
|---|---|---|---|
| 8,401,235 B2 | 3/2013 | Lee | |
| 10,163,016 B2 | 12/2018 | Hayakawa | |
| 10,528,829 B2 | 1/2020 | Kim et al. | |
| 2015/0367845 A1* | 12/2015 | Sannodo | ............... B60W 30/08 701/23 |
| 2017/0355307 A1* | 12/2017 | Ha | .......................... H04N 7/183 |
| 2018/0188045 A1* | 7/2018 | Wheeler | ................. G06F 16/29 |

(Continued)

FOREIGN PATENT DOCUMENTS

| | | |
|---|---|---|
| JP | 2006-209429 | 8/2006 |
| KR | 10-2009-0000211 | 1/2009 |

(Continued)

*Primary Examiner* — Kenneth J Malkowski
(74) *Attorney, Agent, or Firm* — H.C. Park & Associates, PLC

(57) ABSTRACT

A parking assistance apparatus includes at least one camera sensor installed in a vehicle, a control unit configured to analyze an image obtained through the camera sensor to recognize a space and object in a parking lot by matching a detailed parking lot map to an object, search for an available parking space by calculating a parking region on the basis of recognized space and object information, and generate a path to the available parking space searched for, or perform autonomous parking until reaching the available parking space, and a storage unit configured to store the detailed parking lot map for recognizing the space and object.

20 Claims, 3 Drawing Sheets

(56) References Cited

U.S. PATENT DOCUMENTS

| | | | |
|---|---|---|---|
| 2018/0370566 A1* | 12/2018 | Kojo | B60R 21/00 |
| 2019/0063947 A1* | 2/2019 | Beaurepaire | G01C 21/3685 |
| 2019/0291721 A1* | 9/2019 | Sakano | B60W 30/06 |
| 2019/0303691 A1* | 10/2019 | Maeda | G06K 9/629 |
| 2020/0025935 A1* | 1/2020 | Liang | G06K 9/629 |
| 2020/0041992 A1* | 2/2020 | Nagashima | G06F 3/04817 |

FOREIGN PATENT DOCUMENTS

| | | |
|---|---|---|
| KR | 10-1283792 | 7/2013 |
| KR | 20170054027 | 5/2017 |
| KR | 20180049567 | 5/2018 |
| KR | 10-2018-0064531 | 6/2018 |
| KR | 10-2018-0094493 | 8/2018 |

* cited by examiner

APPARATUS AND METHOD FOR SUPPORTING PARKING

CROSS-REFERENCE TO RELATED APPLICATION

This application claims priority from and the benefit of Korean Patent Application No. 10-2019-0048848, filed on Apr. 26, 2019, which is hereby incorporated by reference for all purposes as if set forth herein.

BACKGROUND

Field

Exemplary embodiments relate to a parking assistance apparatus and method and, more particularly, to a parking assistance apparatus and method for automatically searching for an available non-regular parking space when a regular parking space is not available in a parking lot to assist with parking in the non-regular parking space.

Discussion of the Background

Recently, with the development of the automobile industry, the number of vehicles has increased and automobile technology has been developed. In particular, by virtue of the development of automobile technology, researches are being actively carried out to develop intelligent vehicles. In particular, technology related to driver assist systems (DASs) has been significantly developed and is applied to intelligent vehicles.

Researches are being actively carried out to particularly develop a parking assistance system which is one of DASs, and such parking assistance systems are currently actually applied and used.

The above systems for assisting with parking a vehicle involve technology for recognizing a parking space, generating a parking trajectory (path), and controlling steering.

Furthermore, according to the technology for recognizing a parking space, it can recognize parking space and perpendicular parking space, and a plurality of sensors such as ultrasonic sensors, cameras, radar, or lidar are used to recognize a parking space. That is, a parking space is recognized based on information detected through a plurality of sensors.

Therefore, a parking space can be more accurately recognized with more amount of sensing information. However, the more amount of sensing information, the more complicated an algorithm for combining the sensing information becomes, and loads on a parking assistance system increase, thus increasing the manufacturing cost of a vehicle. Furthermore, one failure in a certain sensor to be combined, deteriorates the accuracy of a parking space recognition algorithm.

Therefore, it is necessary to develop technology for parking assistance using a single sensor (e.g., a camera sensor) that is the most basic sensor for assisting parking a vehicle.

The background art of the present invention is disclosed in Korean Patent Application Laid-open Publication No. 10-2009-0000211 (published on Jan. 7, 2009, entitled "PARKING MANAGEMENT SYSTEM AND METHOD"), which is incorporated by reference for all purposes as if fully set forth herein.

The above information disclosed in this Background section is only for enhancement of understanding of the background of the invention and, therefore, it may contain information that does not constitute prior art.

SUMMARY

Exemplary embodiments of the present invention provide a parking assistance apparatus and method for automatically searching for an available non-regular parking space when a regular parking space is not available in a parking lot to assist parking in the non-regular parking space.

A first exemplary embodiment of the present invention provides a parking assistance apparatus including at least one camera sensor installed in a vehicle, a control unit configured to analyze an image obtained through the camera sensor to recognize a space and object in a parking lot by matching a detailed parking lot map to an object, search for an available parking space by calculating a parking region on the basis of recognized space and object information, and generate a path to the available parking space searched for, or perform autonomous parking until reaching the available parking space, and a storage unit configured to store the detailed parking lot map for recognizing the space and object.

The camera sensor may be installed at least one of a front part, two side parts, rear part, and upper part of the vehicle.

The detailed parking lot map may include at least one of specific shape and size information about a fixed object installed in the parking lot, information about a location or bearing in which the fixed object is installed in the parking lot, a floor area of the parking lot, a location and area of a regular parking space, and information about a road length and area in the parking lot.

The control unit may detect an orientation of the vehicle and a current location of the vehicle in the parking lot on the basis of fixed object information detected through the camera sensor.

The control unit may calculate or estimate a distance from the vehicle to a mobile object and a size of the mobile object on the basis of size information and distance information about a fixed object near the mobile object from a current location of the vehicle.

The control unit may calculate a shape and area of a parking space by referring to the detailed parking lot map to calculate the available parking space, wherein the control unit may reflect not only an edge of another vehicle parked at one side of a parking space but also a tire alignment state and a folded/unfolded state of a side-view mirror.

When searching for the available parking space, the control unit may search for a regular parking space that is a parking space with parking lines, and, when there is no available regular parking space, may search for a non-regular parking space that is a space without parking lines and large enough to park the vehicle.

The control unit may be capable of communicating with an information providing device in the parking lot to search for the regular parking space and the non-regular parking space, and may search for the available parking space that is an empty parking space by moving the vehicle on the basis of statistical information about a vehicle non-concentration region.

The control unit may output an alarm after checking a neutral gear stage when parking the vehicle in the non-regular parking space, and may output the alarm after checking whether the vehicle is parked at an angle at which the vehicle does not collide with another vehicle or object present in a forward direction of movement of the vehicle when the vehicle parked in the non-regular parking space is pushed and moved so as to prevent the vehicle from colliding with the other vehicle or object.

The control unit may generate and output a parking path to the available parking space when simply assisting a driver in parking the vehicle, and may control operation of a steering device and acceleration/deceleration device when performing autonomous parking.

According to one or more exemplary implementation of the invention, a method for parking assistance includes steps of, analyzing, by a control unit, an image captured through at least one camera sensor installed in a vehicle to recognize a space and object in a parking lot, searching for, by the control unit, a regular parking space by analyzing the image, searching for, by the control unit, a non-regular parking space near the vehicle when the regular parking space is not discovered as a result of the searching for the regular parking space, determining, by the control unit, whether the vehicle is able to be parked by accurately calculating an available parking space in the non-regular parking space by reflecting a shape and size of the vehicle when the non-regular parking space is discovered, and generating and outputting, by the control unit, a parking path to the available parking space to assist a driver in parking the vehicle or controlling operation of a steering device and acceleration/deceleration device to perform autonomous parking when the vehicle is able to be parked in the non-regular parking space.

The method may further include generating and displaying, by the control unit, the parking path to the regular parking space or performing a parking control until reaching the regular parking space through autonomous driving when the regular parking space is discovered.

The method may further include inducing, by the control unit, the driver to move the vehicle to a vehicle non-concentration region or performing a movement control until reaching the vehicle non-concentration region through autonomous driving when the regular parking space is not discovered.

The method may further include checking, by the control unit, whether the vehicle obstructs a path of another vehicle when the vehicle is parked in the non-regular parking space and re-searching for the non-regular parking space if the vehicle obstructs the path of the other vehicle, when the non-regular parking space is determined to be available for parking.

The detailed parking lot map may include at least one of specific shape and size information about a fixed object installed in the parking lot, information about a location or bearing in which the fixed object is installed in the parking lot, a floor area of the parking lot, a location and area of a regular parking space, and information about a road length and area in the parking lot.

The control unit may detect an orientation of the vehicle and a current location of the vehicle in the parking lot on the basis of fixed object information detected through the camera sensor to recognize the space and object in the parking lot.

The control unit may calculate a shape and area of a parking space by referring to a detailed parking lot map to calculate the available parking space, wherein the control unit may reflect not only an edge of another vehicle parked at one side of a parking space but also a tire alignment state and a folded/unfolded state of a side-view mirror.

The control unit may be capable of communicating with an information providing device in the parking lot to search for the regular parking space or the non-regular parking space, and may search for the available parking space that is an empty parking space by moving the vehicle on the basis of statistical information about a vehicle non-concentration region.

The control unit may output an alarm after checking a neutral gear stage when parking the vehicle in the non-regular parking space, and may output the alarm after checking whether the vehicle is parked at an angle at which the vehicle does not collide with another vehicle or object present in a forward direction of movement of the vehicle when the vehicle parked in the non-regular parking space is pushed and moved so as to prevent the vehicle from colliding with the other vehicle or object.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
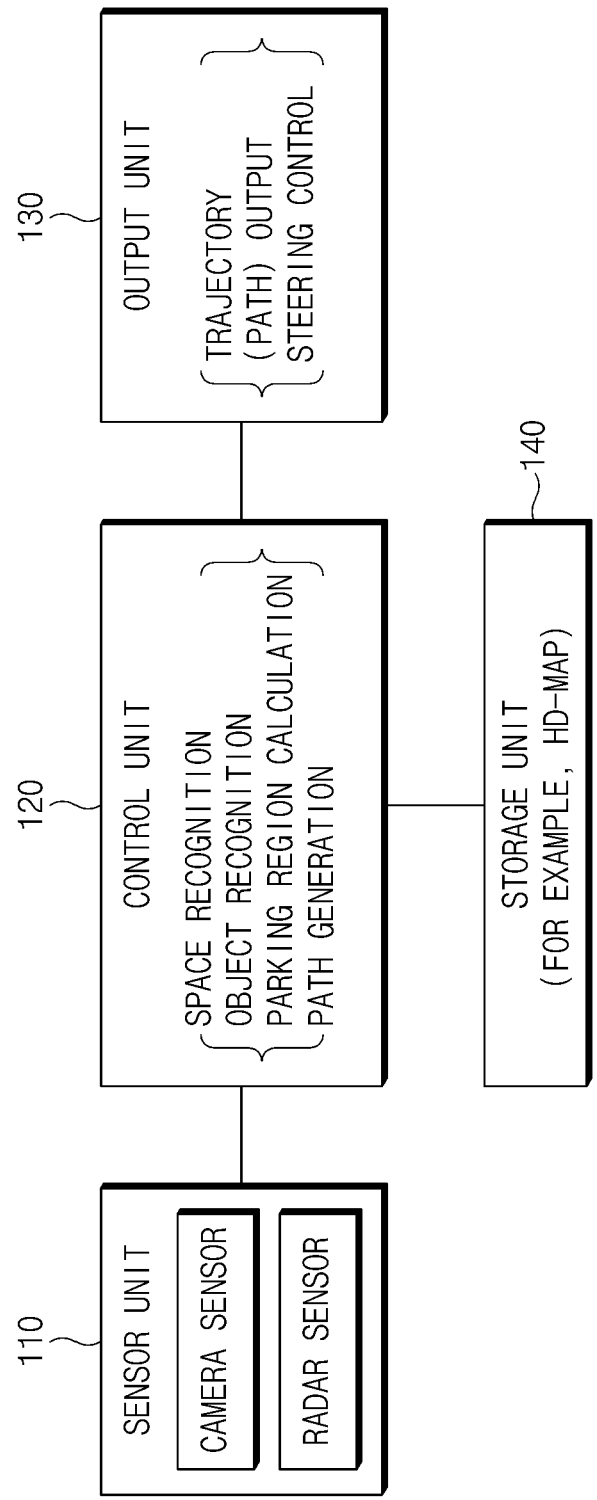
FIG. 1 is a schematic diagram illustrating a configuration of a parking assistance apparatus according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not to be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. In the drawings, the size and relative sizes of layers and regions may be exaggerated for clarity. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Hereinafter, exemplary embodiments of a parking assistance apparatus and method according to the present invention will be described with reference to the accompanying drawings.

The thicknesses of the lines or the sizes of the elements illustrated in the drawings may be exaggerated for clarity and for convenience. Furthermore, the terms used herein are defined in consideration of functions of the present invention, but may be differently defined according to the customary practice or the intention of a user or operator. Thus, the definition of such terms should be determined based on the overall content of the present disclosure.

FIG. 1 is a schematic diagram illustrating a configuration of a parking assistance apparatus according to an exemplary embodiment of the present invention.

As illustrated in FIG. 1, the parking assistance apparatus according to the present embodiment includes a sensor unit 110, a control unit 120, an output unit 130, and a storage unit 140.

The sensor unit 110 may basically include a camera sensor and may further include a radar sensor. However, the radar sensor is not necessarily included.

Here, a plurality of camera sensors may be provided. For example, one or more camera sensors may be installed at a front part, two side parts, rear part, and upper part of a vehicle. Accordingly, fixed objects may be detected in a 360-degree direction with respect to the vehicle.

The control unit 120 performs space recognition and object recognition (e.g., a fixed object or a mobile object) by analyzing an image obtained through the camera sensor of the sensor unit 110, calculates a parking region based on the recognized space and object information, and generates a path (or trajectory) to an available parking space.

The control unit 120 may refer to a detailed parking lot map HD-Map stored in the storage unit 140 to recognize the space and object. That is, the control unit 120 recognizes a space and object in a parking lot by matching the detailed parking lot map to the object in the analyzed image. Furthermore, the control unit 120 may also determine a location of a host vehicle by matching the detailed parking lot map and the object in the image to each other.

Here, the detailed parking lot map includes at least one of a specific shape and size information about a fixed object, information about a location (or bearing) in which the fixed object is installed in a parking lot, a floor area of the parking lot, a location and area of a regular parking space, and information about a road length and area in the parking lot.

Furthermore, although not specifically illustrated in FIG. 1, the control unit 120 may calculate a current location of a vehicle by communicating (e.g., V2X, V2I, V2V) with an information providing device (not shown) in a parking lot via a communication unit (not shown) (e.g., a communication unit included in a vehicle, or a communication unit provided in a mobile terminal (e.g., smartphone) interworking with a vehicle). When the parking lot is located outdoor where GPS signal may be received, the control unit 120 may also use GPS signal to calculate current location of a vehicle.

Even if the above-described communication is not available, the control unit 120 may detect an orientation of a vehicle and the current location of the vehicle based on the fixed object information detected in a 360-degree direction through the plurality of camera sensors.

Therefore, the control unit 120 may recognize a space and object (e.g., a fixed object) in a parking lot using the image captured through the camera sensor, the detailed parking lot map, and current location information about a vehicle.

Furthermore, when the object is a mobile object (e.g., moving object, pedestrian, vehicle, motorcycle, and the like in a parking lot), the control unit 120 may calculate a distance from the vehicle to the mobile object and a shape and size of the mobile object by referring to information about a fixed object (e.g., parking line, rubber bump, signpost, guide line, pillar, and the like) near the mobile object from the current location of the vehicle.

Here, in the present embodiment, when calculating the size of the mobile object (particularly a vehicle parked earlier), the control unit 120 detects not only an edge (or corner) but also a tire alignment state (e.g., when tires are not aligned in a straight line, a portion of a tire protrudes out of a body of a vehicle) and a folded/unfolded state of a side-view mirror to reflect the same in calculating the size.

The storage unit 140 may further store shape and size information corresponding to the type of a mobile object in addition to the detailed parking lot map. Therefore, when calculating the size of a mobile object, the control unit 120 may refer to the shape and size information according to the type of a mobile object stored in the storage unit 140.

Furthermore, the control unit 120 analyzes image information captured through the camera sensor to search for a regular parking space (i.e., space with parking lines) and search for a non-regular parking space (i.e., space without parking lines and large enough to park a vehicle). Here, the control unit 120 may refer to the detailed parking lot map HD-Map to calculate a shape and area of the non-regular parking space.

Furthermore, the control unit 120 may communicate (e.g., V2X, V2I, V2V) with an information providing device (not shown) in a parking lot to search for a regular parking space and a non-regular parking space, and may move a vehicle based on the statistical information about a vehicle non-concentration region to quickly search for an empty parking space (i.e., available parking space).

To this end, the control unit 120 may generate and display a path (or trajectory) to a vehicle non-concentration region until an empty vehicle space (i.e., available parking space) is located, or may control a steering operation until reaching a vehicle non-concentration region when autonomous driving is on.

Furthermore, when parking in a non-regular parking space due to failure to discover an empty regular parking space (i.e., available parking space), the control unit 120 may check a neutral (N) gear stage, and may check whether a vehicle is in a straightly aligned state to avoid collision with a parked vehicle or an object when moving the vehicle. Furthermore, the control unit 120 may notify a check result to a user when simply assisting a driver in parking a vehicle, and may control steering when in autonomous parking mode.

The control unit 130 outputs a parking path (trajectory) when simply assisting a driver in parking a vehicle according to control by the control unit 120, outputs an alarm related to the check result so as to prevent collision or inconvenience that may occur when parking a vehicle in the non-regular parking space, and controls operation of a steering device (not shown) and acceleration/deceleration device (not shown) when performing autonomous parking.

Hereinafter, operation of the control unit 120 will be described in more detail with reference to FIGS. 2 and 3.

Figure 2:
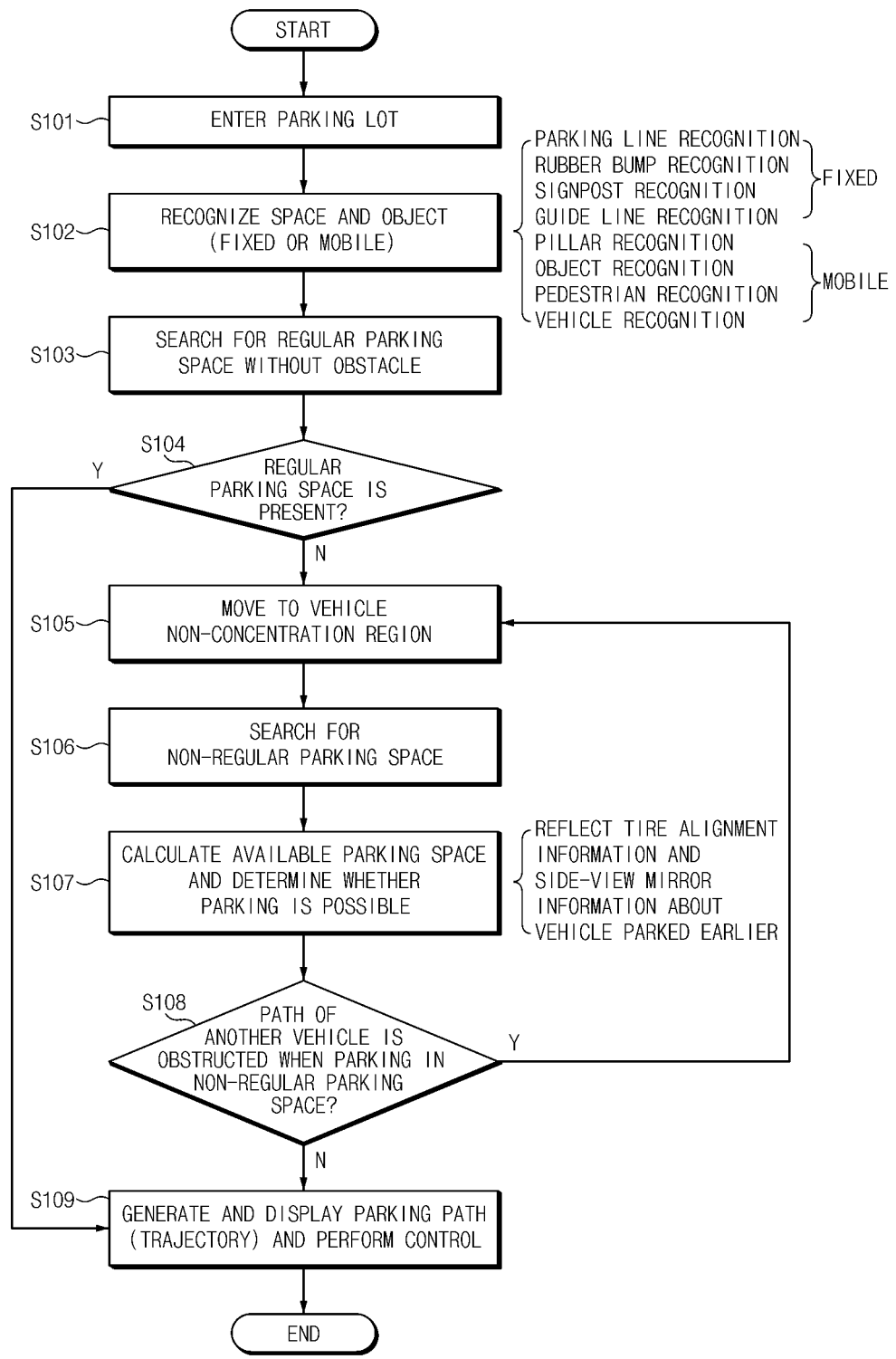
FIG. 2 is a flowchart illustrating a parking assistance method according to an exemplary embodiment of the present invention.

FIG. 2 is a flowchart illustrating a parking assistance method according to an exemplary embodiment of the present invention.

As illustrated in FIG. 2, when a vehicle enters a parking lot (S101), the control unit 120 recognizes a space and object (fixed object, mobile object) in the parking lot by analyzing an image captured through at least one camera sensor installed in the vehicle (S102).

Here, the control unit 120 uses the detailed parking lot map HD-Map.

Here, the detailed parking lot map includes at least one of specific shape and size information about a fixed object, information about a location (or bearing) in which the fixed object is installed in a parking lot, a floor area of the parking lot, a location and area of a regular parking space, and information about a road length and area in the parking lot.

Furthermore, the control unit 120 searches for a regular parking space without an obstacle (e.g., a vehicle parked earlier) through the image analysis (S103).

As a result of the search (S103), when a regular parking space is present (YES in S104), it generates and displays a parking path (or trajectory) to the regular parking space, or a parking control (e.g., steering control, acceleration/deceleration control) is performed until reaching the regular parking space through autonomous driving (S109).

However, when the search result (S103) does not show a regular parking space (NO in S104), the control unit 120 allows the vehicle to move to a vehicle non-concentration region, or performs a movement control (e.g., steering control, acceleration/deceleration control) until reaching the vehicle non-concentration region through autonomous driving (S105).

Furthermore, the control unit 120 searches for a non-regular parking space nearby (S106) and, when found the non-regular parking space, determines whether the vehicle is able to park by accurately calculating a space available for parking in the non-regular parking space by reflecting the shape and size of the vehicle (S107).

For example, the control unit 120 refers to the detailed parking lot map HD-Map to calculate the shape and area of the non-regular parking space, and, at this time, the control unit 120 detects not only an edge (or corner) of an object (e.g., a vehicle parked earlier) present at one side of the non-regular parking space but also a tire alignment state (e.g., when tires are not aligned in a straight line, a portion of a tire protrudes out of a body of a vehicle) and a folded/unfolded state of a side-view mirror to calculate the size (or area) of the non-regular parking space.

Here, the vehicle does not necessarily move to the vehicle non-concentration region (S105), and thus it may be moved optionally according to situations.

When it is determined that the vehicle is able to park in the non-regular parking space through the accurate calculation of a space available for parking as described above, the control unit 120 checks whether the vehicle obstructs a path of another vehicle (e.g., a vehicle parked earlier or a moving vehicle) if the vehicle is parked in the non-regular parking space that was determined to be available for parking (S108).

That is, when the vehicle is able to be parked in the non-regular parking space, but obstructs the path of another vehicle when parked in the non-regular parking space (YES in S108), the control unit 120 repeatedly performs operations S105 to S108 (i.e., determining whether parking is possible by searching for a non-regular parking space after moving to another vehicle non-concentration region).

However, when the vehicle does not obstruct the path of the other vehicle even if the vehicle is parked in the non-regular parking space (NO in S108), the control unit 120 generates and displays a parking path (or trajectory) to the regular parking space to assist a driver in parking the vehicle, or performs a parking control (e.g., steering control, acceleration/deceleration control) until reaching the non-regular parking space for autonomous parking (S109).

Figure 3:
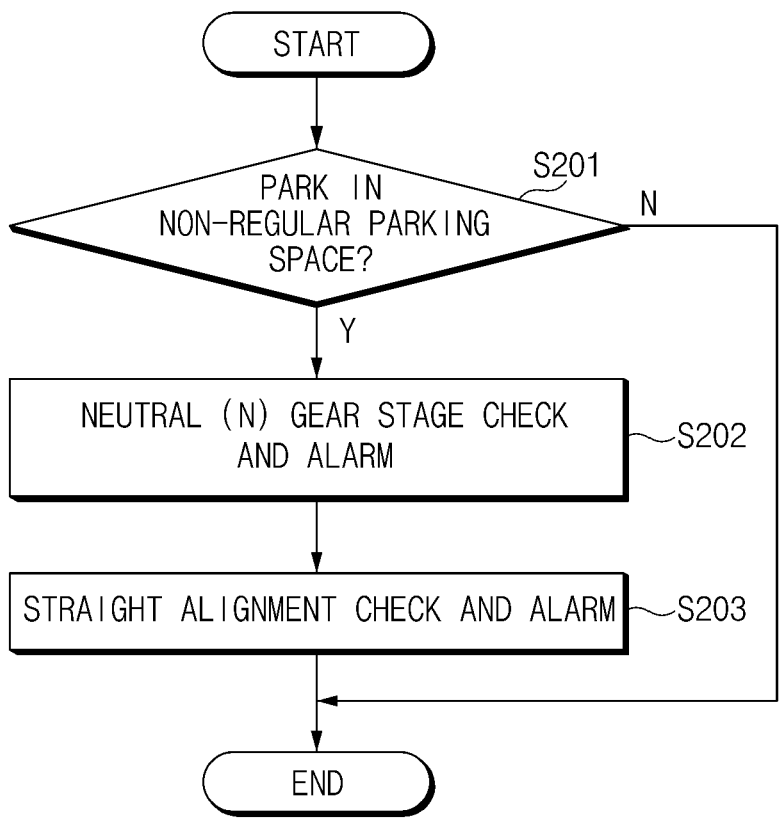
FIG. 3 is a flowchart illustrating an additional parking assistance operation when parking a vehicle in a non-regular parking space as described above with reference to FIG. 2.

FIG. 3 is a flowchart illustrating an additional parking assistance operation when parking a vehicle in a non-regular parking space as described above with reference to FIG. 2.

As described in FIG. 3, when found that the vehicle is able to be parked in the non-regular parking space through the accurate calculation of a space available for parking (YES in S201), the control unit 120 checks a neutral (N) gear stage and outputs an alarm (S202).

Furthermore, the control unit 120 outputs an alarm after checking whether the vehicle is parked at an angle (i.e., a straightly aligned state or a parallel aligned state) at which the vehicle does not collide with another vehicle or object present in a forward direction of movement of the vehicle when the vehicle parked in the non-regular parking space is pushed and moved so as to allow the other vehicle to exit or move, thereby preventing the vehicle from colliding with the other vehicle or object (S203).

As described above, in the present embodiment, when a vehicle is parked in the non-regular parking space, an alarm related to a result of checking a neutral gear state and a parking angle is output to assist a driver in parking the vehicle so as to prevent a collision accident or inconvenience that a driver of another vehicle may experience. When performing autonomous parking, operation of a steering device (not shown) and acceleration/deceleration device (not shown) is controlled to automatically control the neutral gear state and the parking angle.

As described above, according to the present embodiment, a non-regular parking space is automatically searched for when a regular parking space is not available in a parking lot so as to assist with parking in the non-regular parking space, and, furthermore, a camera sensor is used to recognize an available parking space and generate a parking trajectory (path), thus reducing a load of a parking assistance system and the manufacturing cost of a vehicle.

Although the present invention has been described with reference to the exemplary embodiments illustrated in the drawings, it should be understood that other various modifications and equivalent embodiments could be made by those skilled in the art. Therefore, the technical protection scope of the present invention should be determined by the following claims. Furthermore, the exemplary embodiments described herein may be implemented as, for example, methods, processes, devices, software programs, data streams, or signals. Even though a single type of implementation (e.g., a method) is described, described features may be implemented in other forms (e.g., a device or program). A device may be implemented as appropriate hardware, software, firmware, and the like. A device may be implemented on a device such as a processor or the like which generally refers to a processing device including a computer, a microprocessor, an integrated circuit, a programmable logic device, or the like. A processor includes a communication device such as a computer, a cell phone, a personal digital assistant (PDA), or the like for facilitating information communication between end users.

What is claimed is:

1. A parking assistance apparatus, comprising:
    a camera sensor installed in a vehicle;
    a control unit configured to analyze an image obtained through the camera sensor to recognize a space and an object in a parking lot by matching a detailed parking lot map to the object, search for an available parking space that is defined by at least one parking line by calculating a parking region on the basis of recognized space and object information, and output a parking path to the available parking space; and
    a storage unit configured to store the detailed parking lot map for recognizing the space and object,
    wherein the control unit is further configured to:
        determine that there is no available parking space;
        search for a first empty space that is a first space without parking lines and large enough to park the vehicle;
        determine whether the vehicle obstructs a path of another vehicle when the vehicle is parked in the searched first empty space, based on the space and the object in a parking lot and the detailed parking lot map;
        responsive to determining that the vehicle obstructs the path of another vehicle, recognize the searched first empty space as the available parking space; and
        responsive to determining that the vehicle does not obstruct the path of another vehicle, search for another available parking space that is defined by at least one parking line or a second empty space that is a second space without parking lines and large enough to park the vehicle.

2. The parking assistance apparatus of claim 1, wherein the camera sensor is installed on at least one of a front part, two side parts, rear part, and upper part of the vehicle.

3. The parking assistance apparatus of claim 1, wherein the detailed parking lot map comprises at least one of specific shape and size information about a fixed object installed in the parking lot, information about a location or bearing in which the fixed object is installed in the parking lot, a floor area of the parking lot, a location and area of a regular parking space, and information about a road length and area in the parking lot.

4. The parking assistance apparatus of claim 1, wherein the control unit detects an orientation of the vehicle and a current location of the vehicle in the parking lot on the basis of fixed object information detected through the camera sensor.

5. The parking assistance apparatus of claim 1, wherein the control unit calculates or estimates a distance from the vehicle to a mobile object and a size of the mobile object on the basis of size information and distance information about a fixed object near the mobile object from a current location of the vehicle.

6. The parking assistance apparatus of claim 1, wherein the control unit calculates a shape and area of a parking space by referring to the detailed parking lot map to calculate the available parking space, wherein the control unit reflects not only an edge of another vehicle parked at one side of a parking space but also a tire alignment state and a folded/unfolded state of a side-view mirror.

7. The parking assistance apparatus of claim 1, wherein the control unit is capable of communicating with an information providing device in the parking lot,
    the control unit further configured to:
        determine a vehicle non-concentration region in the parking lot on the basis of information received from the information providing device, and
        determine at least one of the available parking space, another available parking space, the first empty space, or the second empty space on the basis of the vehicle non-concentration region.

8. The parking assistance apparatus of claim 1, the control unit further configured to:
    output an alarm after checking a neutral gear stage in response to the vehicle being parked in the first empty space or the second empty space, and
    output the alarm after checking that the vehicle is parked at an angle at which the vehicle does not collide with another vehicle or object present in a forward direction of movement of the vehicle in response to the vehicle parked in the first empty space or the second empty space being pushed and moved so as to prevent the vehicle from colliding with the other vehicle or object.

9. The parking assistance apparatus of claim 1, wherein the control unit controls operation of a steering device and acceleration/deceleration device of the vehicle on the basis of the parking path.

10. A method for parking assistance, comprising steps of:
    analyzing, by a control unit, an image captured through at least one camera sensor installed in a vehicle to recognize a space and an object in a parking lot by matching a detailed parking lot map to the object;
    searching for, by the control unit, an available parking space that is defined by at least one parking line by analyzing the image;
    outputting a parking path to the available parking space;
    not discovering the available parking space during the searching for the available parking space;
    searching for, by the control unit, a first empty space that is a first space without parking lines and large enough to park the vehicle;
    determining, by the control unit, whether the vehicle obstructs a path of another vehicle when the vehicle is parked in the searched first empty space, based on the space and the object in the parking lot and the detailed lot map;

responsive to the vehicle being determined to be able to be parked in the non-regular parking space, generating and outputting, by the control unit, a parking path to the available parking space to assist a driver in parking the vehicle or controlling operation of a steering device and acceleration/deceleration device to perform autonomous parking into the non-regular parking space;

responsive to determining that the vehicle obstructs the path of another vehicle, recognizing, by the control unit, the searched first empty space as the available parking space; and responsive to determining that the vehicle does not obstruct the path of another vehicle, searching for, by the control unit, other available parking space that is defined by at least one parking line or a second empty space that is a second space without parking lines and large enough to park the vehicle.

11. The method of claim 10, further comprising steps of:
controlling, by the control unit, operation of a steering device and
acceleration/deceleration device of the vehicle on the basis of the parking path.

12. The method of claim 10, further comprising steps of:
communicating with an information providing device in the parking lot;
determining, by the control unit, a vehicle non-concentration region in the parking lot on the basis of information received from the information providing device, and
determining at least one of the available parking space, other available parking space, the first empty space or the second empty space on the basis of the vehicle non-concentration region.

13. The method of claim 10, wherein the detailed parking lot map comprises:
at least one of specific shape and size information about a fixed object installed in the parking lot;
information about a location or bearing in which the fixed object is installed in the parking lot, a floor area of the parking lot, a location and area of the regular parking space; and
information about a road length and area in the parking lot.

14. The method of claim 10, wherein the control unit detects an orientation of the vehicle and a current location of the vehicle in the parking lot on the basis of fixed object information detected through the camera sensor to recognize the space and object in the parking lot.

15. The method of claim 10, wherein the control unit calculates a shape and area of a parking space by referring to the detailed parking lot map to calculate the available parking space, wherein the control unit takes into consideration not only an edge of another vehicle parked at one side of a parking space but also a tire alignment state and a folded/unfolded state of a side-view mirror.

16. The method of claim 10, wherein the control unit is capable of communicating with an information providing device in the parking lot to search for the regular parking space or the non-regular parking space.

17. The method of claim 10, further comprising:
outputting, by the control unit, an alarm after checking a neutral gear stage in response to the vehicle being parked in the first empty space or the second empty space, and outputting, by the control unit, the alarm after checking that the vehicle is parked at an angle at which the vehicle does not collide with another vehicle or object present in a forward direction of movement of the vehicle.

18. A vehicle, comprising:
a camera sensor installed in a vehicle;
a control unit;
an output unit; and
a storage unit,
wherein the control unit is configured to:
analyze an image obtained through the camera sensor to recognize a space and an object in a parking lot by matching a detailed parking lot map to the object;
search for an available parking space that is defined by at least one parking space by calculating a parking region on the basis of recognized space and object information; and
generate a path to the available parking space searched for, or perform autonomous parking until reaching the available parking space, and
wherein the storage unit is configured to:
store the detailed parking lot map for recognizing the space and object,
wherein
the control unit further configured to:
determine that there is no available parking space; and
search for a non-regular parking first empty space that is a first space without parking lines and large enough to park the vehicle,
determine whether the vehicle obstructs a path of another vehicle when the vehicle is parked in the searched first empty space, based on the space and the object in a parking lot and the detailed parking lot map;
responsive to determining that the vehicle obstructs the path of another vehicle, recognize the searched first empty space as the available parking space; and
responsive to determining that the vehicle does not obstruct the path of another vehicle, search for another available parking space that is defined by at least one parking line or a second empty space that is a second space without parking lines and large enough to park the vehicle.

19. The parking assistance apparatus of claim 1, wherein the storage unit is configured to store shape and size information corresponding to a type of mobile object that does not correspond to a vehicle, and
wherein, based on the shape and size information as compared to the image obtained through the camera sensor, the control unit determines that a size and shape corresponding to the type of mobile object exists in the parking path to the available parking space.

20. The vehicle of claim 18, wherein the control unit is further configured to:
output an alarm after checking a neutral gear stage in response to the vehicle being parked in the first empty space or the second empty space, and
output the alarm after checking that the vehicle is parked at an angle at which the vehicle does not collide with another vehicle or object present in a forward direction of movement of the vehicle in response to the vehicle parked in the first empty space or the second empty space being pushed and moved so as to prevent the vehicle from colliding with the other vehicle or object.

* * * * *

UNITED STATES PATENT AND TRADEMARK OFFICE
CERTIFICATE OF CORRECTION

PATENT NO. : 11,390,324 B2
APPLICATION NO. : 16/858207
DATED : July 19, 2022
INVENTOR(S) : Joo Young Jang and Dong Yul Lee It is certified that error appears in the above-identified patent and that said Letters Patent is hereby corrected as shown below:

On the Title Page

For item (73) Assignee, please correct it as follows:
Name of Assignee: HYUNDAI MOBIS CO., LTD.
Residence: Seoul, Republic of Korea Signed and Sealed this
Third Day of September, 2024

Katherine Kelly Vidal
*Director of the United States Patent and Trademark Office*